United States Patent [19]
Song et al.

[11] Patent Number: 6,144,979
[45] Date of Patent: Nov. 7, 2000

[54] METHOD AND APPARATUS FOR PERFORMING MULTIPLY OPERATION OF FLOATING POINT DATA IN 2-CYCLE PIPELINE SCHEME

[75] Inventors: Yoon Seok Song; Dong Bum Koh, both of Kyoungki-do, Rep. of Korea

[73] Assignee: Hyundai Electronics Industries Co., Ltd., Ichon-shi, Rep. of Korea

[21] Appl. No.: 09/082,586

[22] Filed: Apr. 21, 1998

[30] Foreign Application Priority Data

May 22, 1997 [KR] Rep. of Korea ....................... 97-20108

[51] Int. Cl.[7] ...................................................... G06F 7/38
[52] U.S. Cl. ........................................... 708/620; 708/627
[58] Field of Search ....................................... 708/503, 620, 708/603, 625, 627, 628, 629, 630, 631, 632

[56] References Cited

U.S. PATENT DOCUMENTS 5,220,525  6/1993  Anderson et al. ....................... 708/631
5,235,195  8/1993  Tran et al. ............................... 257/59
5,517,438  5/1996  Dao-Trong et al. .
5,675,527  10/1997  Yano ....................................... 708/628

*Primary Examiner*—Chuong Dinh Ngo
*Attorney, Agent, or Firm*—Jacobson, Price, Holman & Stern, PLLC

[57] ABSTRACT

The present invention provides a method and an apparatus for performing multiply operation of floating point data in 2-cycle pipeline scheme, which can be applied to pipelined data path so that it is always capable of processing floating point data as long as the data is not contiguous, for reducing the area of the multiplier by reducing the number of basic cells used to ⅓ of that of basic cells used in conventional techniques. The present invention for multiplying floating point data includes the steps of: (a) receiving multiplier data and multiplicand data from pipelined input in the first cycle of multiply operation; (b) generating a partial product by means of the multiplier data and multiplicand data, and generating a first sum and a first carry by adding the partial product through an adding tree circuit; and (c) generating an output of the multiply operation by adding a second sum and a second carry to the first sum and the first carry, wherein the second sum and the second carry are generated by feed-backing the first sum and the first carry in the second cycle of the multiply operation which succeeds the first cycle.

13 Claims, 3 Drawing Sheets

METHOD AND APPARATUS FOR PERFORMING MULTIPLY OPERATION OF FLOATING POINT DATA IN 2-CYCLE PIPELINE SCHEME

BACKGROUND OF THE INVENTION

1. Field of the Invention

This invention relates to a method and apparatus for performing multiply operation of floating point data in 2-cycle pipeline scheme, and more particularly to a method and apparatus for processing multiply operation used in designing a floating point processor in microprocessor. The floating point data processing of a multiplier can be used widely to design microcontrollers or graphics controllers as well as microprocessors.

2. Description of the Related Art

Generally, multiply operation of floating point data requires a lot of hardware basic cells, i.e. adders. One of the conventional solutions to this is reducing the size of the basic cell or optimizing the structure for higher operating speed. However, these and other conventional solutions are not intended to reduce the number of the used basic cells. Therefore, the areal problem resulted from using so many basic cells still needs to be solved.

SUMMARY OF THE INVENTION

Therefore, the present invention has been made in view of the above mentioned problem, and the present invention provides a method and apparatus for performing multiply operation of floating point data in 2-cycle pipeline scheme, which can be applied to pipelined data path so that it is always capable of processing floating point data as long as the data is not contiguous, for reducing the area of the multiplier by reducing the number of basic cells used to ⅓ of that of basic cells used in conventional techniques.

In accordance with the present invention, there is disclosed a method for multiplying floating point data including the steps of: (a) receiving multiplier data and multiplicand data from pipelined input in the first cycle of multiply operation; (b) generating a partial product by means of the multiplier data and multiplicand data, and generating a first sum and a first carry by adding the partial product through adding tree means; and (c) generating an output of the multiply operation by adding a second sum and a second carry to the first sum and the first carry, wherein the second sum and the second carry are generated by feedbacking the first sum and the first carry in the second cycle of the multiply operation which succeeds the first cycle.

Also, in accordance with the present invention, there is disclosed an apparatus for multiplying floating point data including: (a) input means for receiving multiplier data and multiplicand data from pipelined input in the first cycle of multiply operation; (b) partial product generating means for generating a partial product by means of the multiplier data and multiplicand data received from the input means; (c) adding tree means for generating a first sum and a first carry by adding the partial product generated from the partial product generating means; and (d) output means for generating an output of the multiply operation by adding a second sum and a second carry to the first sum and the first carry, wherein the second sum and the second carry are generated by feedbacking the first sum and the first carry in the second cycle of the multiply operation which succeeds the first cycle.

BRIEF DESCRIPTION OF THE DRAWINGS

A further understanding of the nature and advantage of the present invention will become apparent by reference to the remaining portions of the specification and drawings.

DETAILED DESCRIPTION OF THE PREFERRED EMBODIMENT

A detailed description of an embodiment according to the present invention will be given below with reference to FIG. 1.

Figure 1:
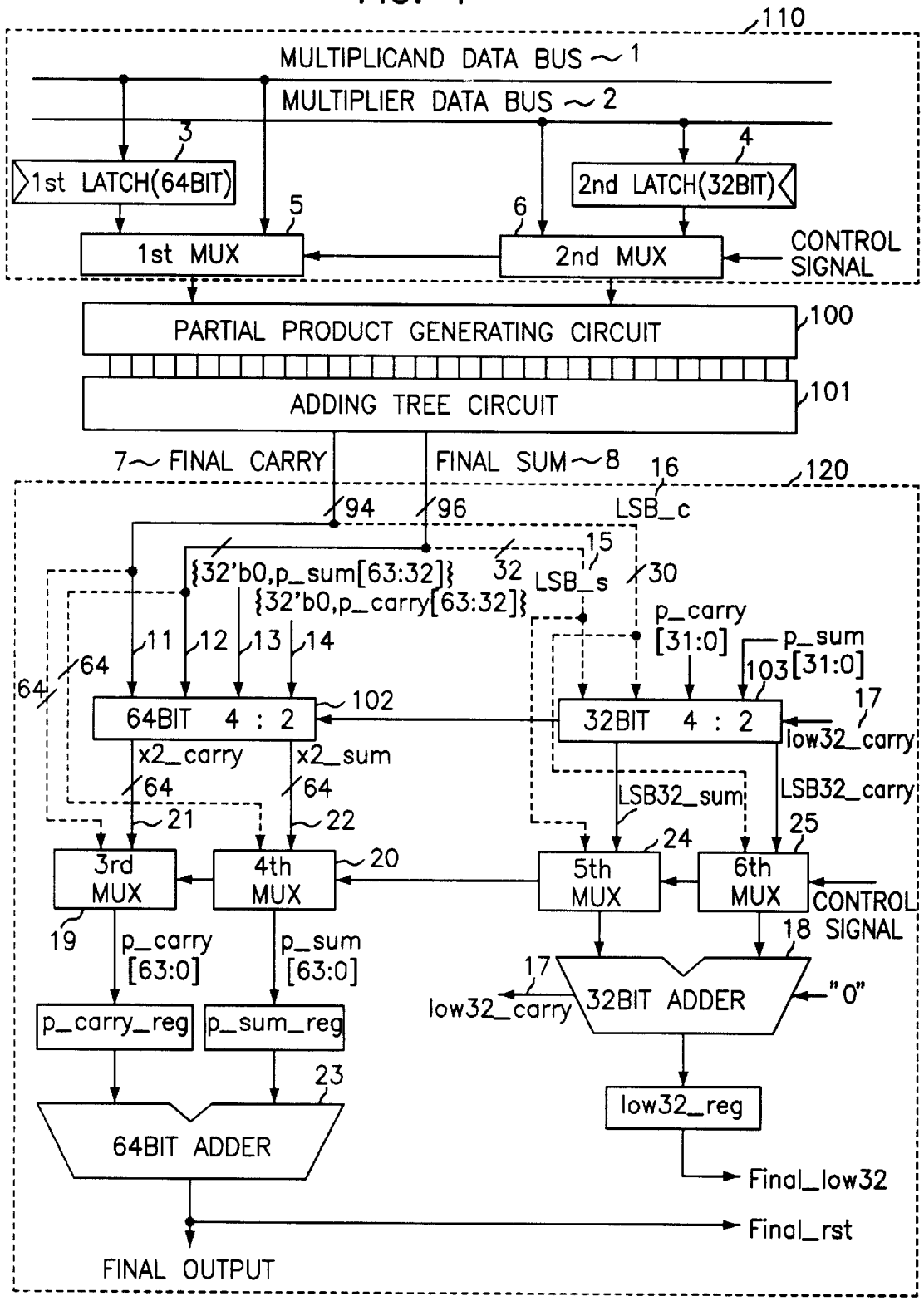
FIG. 1 is a schematic diagram of 64×64 bit pipelined multiplier according to the present invention.
Figure 2:
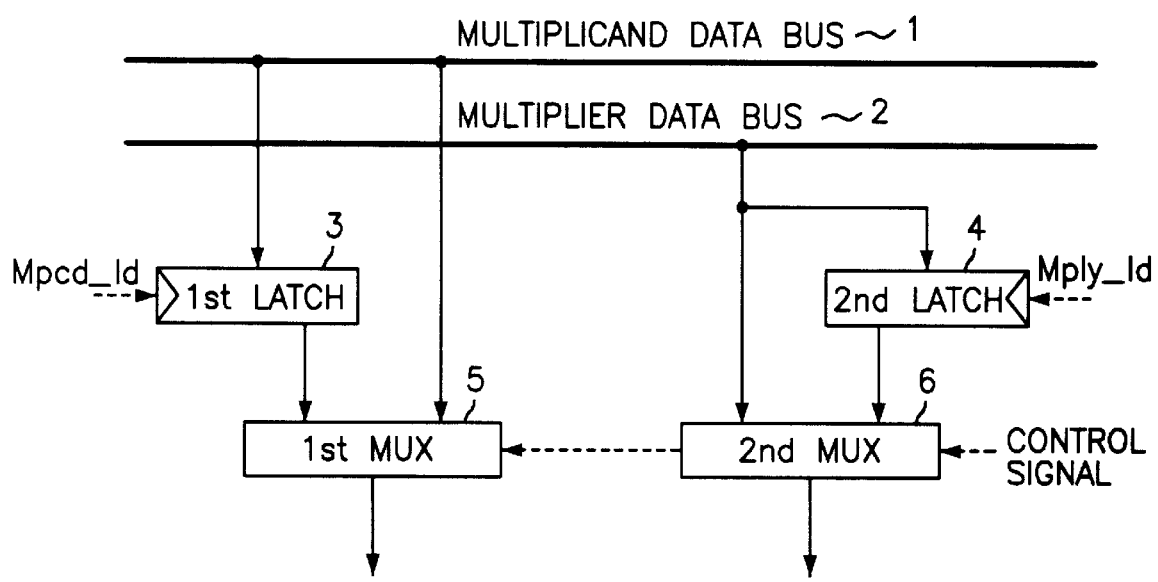
FIG. 2 is a schematic diagram of input circuit for receiving pipelined inputs in two cycles according to the present invention.

First, referring to FIG. 1, a 64×64 bit pipelined multiplier ("multiplier") according to the present invention is shown. The multiplier includes an input terminal 110 for receiving a multiplier data and a multiplicand data from a data bus, a partial product generating circuit 100 for generating a partial product of the multiplier data and a multiplicand data from the input terminal 110, an adding tree circuit 101 for adding the partial product generated from the partial product generating circuit 100, and an output terminal 120 for feedbacking the sum and carry from the adding tree circuit 101, and adding and outputting them. FIG. 2 depicts the input terminal 110 in FIG. 1. The input terminal 110 includes a first and a second latch 3 and 4, which store the multiplier data and multiplicand data respectively, and a first and a second multiplexer 5 and 6 which select data processed in corresponding cycle.

Referring to FIG. 1 and FIG. 2, in the first cycle for beginning the multiply operation of the multiplier data and multiplicand data, the multiplicand data is loaded from the multiplicand data bus 1 and the multiplier data is loaded from the multiplier data bus 2. Here, it is required to compensate the delay due to the data loading because the total delay time may be longer than the delay of the second cycle. However, the data loading delay in the second cycle can be ignored because all of the data is loaded completely during the first cycle.

The loaded multiplier data and multiplicand data are inputted by the first and the second latch 3 and 4, and the first and the second multiplexer 5 and 6, respectively, so that the 2-cycle pipeline scheme can be applied to the loaded data. The first and the second latch 3 and 4 are 64-bit and 32-bit in size, respectively. In the first cycle, the multiplicand data of 64 bits is received directly-from the multiplicand data bus 1, selected by the first multiplexer 5 and used as a multiplicand data of the first cycle. Then, in the second cycle, which succeeds and is pipelined with the first cycle, the data stored in the first latch 3 is selected by the first multiplexer 5 and used as a multiplicand data of the second cycle.

Further, the 64-bit data from the multiplier data bus 2 is separated to upper 32 bits and lower 32 bits. The upper 32-bit data is stored in the second latch 4. The lower 32-bit data is first selected by the second multiplexer 6 and then used as a multiplier data of the first cycle. Then, in the second cycle, which succeeds and is pipelined with the first cycle, the upper 32-bit data latched in the second latch 4 is selected by the second multiplexer 6 and used as a multiplier data of the second cycle.

The partial product generating circuit 100 generates a partial product by using the multiplier data and the multiplicand data from the first and the second multiplexer 5 and 6. The generated partial product is added by the adding tree circuit 101, which is configured to conform to the partial product generating algorithm of the partial product generating circuit 100, and then the final sum 8 and the final carry 7 is outputted by the adding tree circuit 101.

The above mentioned final sum 8 and the final carry 7 from the adding tree circuit 101 are feedbacked and added to the final sum 8 and the final carry 7 of the second cycle so that a final result is generated.

Figure 3:
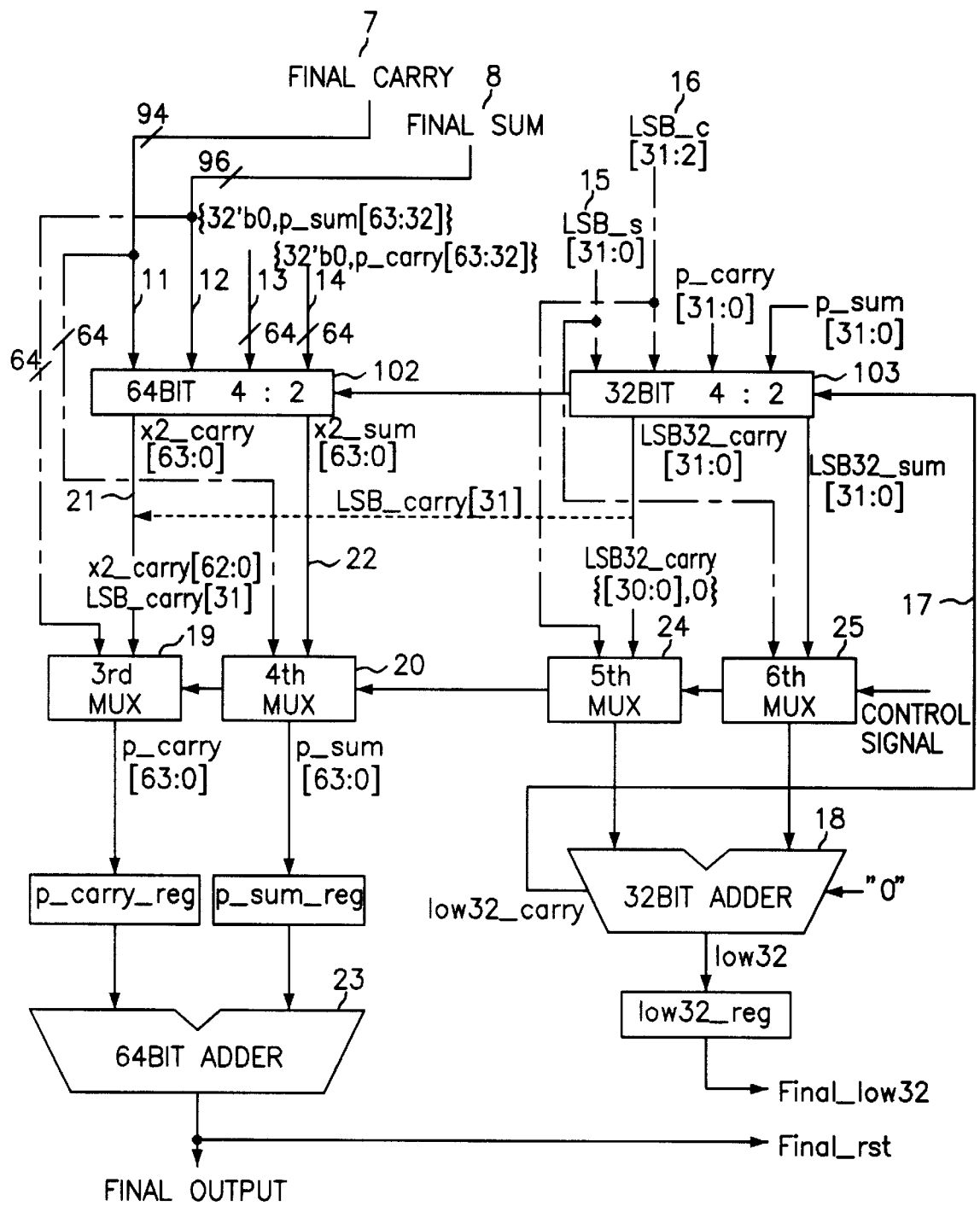
FIG. 3 a schematic diagram of add operation means and calculating means for generating 2-cycle-pipelined output according to the present invention.

Now, referring to FIG. 3, a detailed block diagram of the output terminal 120 is shown. The output terminal comprises a 64-bit 4 to 2 adding module 102, a 32-bit 4 to 2 adding module 103 and four multiplexers 19, 20, 24 and 25, and generates the final output in pipeline operation.

In detail, the final sum 8 of 96 bits and the final carry 7 of 94 bits are first outputted from the adding tree circuit 101 of the first cycle. Then, the fifth and the sixth multiplexer 24 and 25 select and output the lower 32-bit ("LSB_s") 15 of the final sum 8 and the lower 30-bit ("LSB_c") 16 of the final carry 7, respectively. Then, a 32-bit Carry Look-ahead Adder 18 adds the 32-bit LSB-s 15 to the 30-bit LSB_c 16, from the fifth and the sixth multiplexer 24 and 25, respectively, and then generates a low 32_carry 17 which will be added in the pipelined second cycle.

The upper 64 bits of the final sum 8 and the final carry 7 is selected by the third and the fourth multiplexer 19 and 20, and feedbacked for the operation of the pipelined second cycle. The third and the fourth multiplexer 19 and 20 are used to optimize the operation timing and to compensate the delay time for loading the initial input data to the bus, so that in response to control signals, the 64-bit 4 to 2 adding module 102 are allowed to be avoided in order not to be added by a result of a cycle which precedes the first cycle.

In the pipelined second cycle, the feedbacked sum ("p_sum") 13 and the feedbacked carry ("p_carry") 14, which are calculated by the 64-bit 4 to 2 adding module 102 in the first cycle, and the 64×32-bit final sum 11 and carry 12, which are generated in the current second cycle, are added to the low 32_carry 17, which is generated in the first cycle, in order to generate an X2_carry 21 and an X2_sum 22. Then, in response to control signals, the X2_carry 21 and the X2_sum 22 are selected by the third and the fourth multiplexer 19 and 20, and then the final output of the 64×64-bit operation is generated by the final 64-bit adder 23.

Although the preferred embodiment of the present invention has been disclosed for illustrative purposes, those skilled in the art will appreciate that various modifications, additions and substitutions are possible, without departing from the scope and the spirit of the present invention as disclosed in the accompanying claims.

What is claimed is:

1. A method for multiplying floating point data in two pipelined cycles, comprising the steps of:
   (a) receiving multiplier data and multiplicand data from pipelined inputs in a first cycle of multiply operation;
   (b) generating a partial product by means of said multiplier data and multiplicand data, and generating a first sum and a first carry by adding said partial product through adding tree means; and
   (c) generating an output of said multiply operation by adding a second sum and a second carry to said first sum and said first carry, wherein said second sum and said second carry are generated by feedbacking said first sum and the first carry in a second cycle of said multiply operation which succeeds said first cycle;
   wherein said step (c) comprises the step of:
   in said first cycle, generating a carry needed in said second cycle by adding a lower bits portion of said first sum and a lower bits portion of said first carry, wherein the number of bits of said lower bits portion of said first sum is equal to the number of bits of said first sum minus the number of bits of said multiplicand data, and the number of bits of said lower bits portion of said first carry is equal to the number of bits of said first carry minus the number of bits of said multiplicand data.

2. A method as claimed in claim 1, wherein said step (c) comprises the step of feedbacking an upper bits portion of said first sum and an upper bits portion of said first carry of said first cycle in order to be used for operation of said second cycle, wherein the number of bits of said upper bits portion of said first sum is equal to the number of bits of said multiplicand data, and the number of bits of said upper bits portion of said first carry is equal to the number of bits of said multiplicand data.

3. A method as claimed in claim 2, wherein said step (c) comprises the steps of:
   generating a third sum and a third carry by adding said feedbacked first sum and first carry, said second sum and second carry generated in said second cycle and said carry generated in said first cycle; and
   generating said output by adding said third sum and said third carry.

4. A method as claimed in claim 3, wherein, in said step (c),
   said upper bits portion of said first sum and said upper bits portion of said first carry are always selected in said first cycle so that it is avoided to be added by a result of a cycle which precedes said first cycle, in order to optimize the operation timing and to compensate the delay time for loading said multiplier data and said multiplicand data.

5. The method as claimed in claim 1, wherein said step (a) comprises the steps of:
   in said first cycle, receiving said multiplicand data directly from a multiplicand data bus; and
   in said second cycle, receiving said multiplicand data which is stored in said first cycle.

6. The method as claimed in claim 1, wherein said step (a) comprises the steps of:
   in said first cycle, storing an upper bits portion of said multiplier data and inputting a lower bits portion of said multiplier data as said multiplier data of said first cycle; and
   in said second cycle, inputting said upper bits portion of said multiplier data, which is stored in said first cycle, as said multiplier data of said second cycle.

7. A method for multiplying floating point data in two pipeline cycles, comprising the steps of:
   (a) respectively receiving multiplier data and multiplicand data from a multiplier data bus and a multiplicand bus in a first cycle, wherein a predetermined portion of the multiplier data is selected in the first cycle and a remaining portion of the multiplier data is stored in the first cycle and selected in a second cycle;
   (b) generating a partial product by using the multiplier data and the multiplicand data, and generating a first sum and a first carry by adding the partial product in the first cycle;
   (c) doing feedback each predetermined portion of the first sum and the first carry to the second cycle and adding each remaining portion of the first sum and the first carry to generate a third carry; and
   (d) generating an output by adding the feedback portions of the first sum and the first carry, the third carry and a second sum and a second carry respectively generated in the second cycle.

8. The method as claimed in claim 7, wherein the step (a) comprises the steps of:

in the first cycle, storing upper bits of the multiplier data and selecting lower bits of the multiplier data as the multiplier data of the first cycle; and in the second cycle, selecting the stored upper bits of the multiplier data as the multiplier data of the second cycle.

9. The method as claimed in claim 8, wherein, in the sTep (c), the number of bits of the predetermined portion of the first sum is the number of bits of the first sum minus the number of bits of the multiplicand data, and the number of bits of the predetermined portion of the first carry is the number of bits of the first carry minus the number of bits of the multiplicand data.

10. The method as claimed in claim 9, wherein the step (d) comprises the steps of:

generating a fourth sum and a fourth carry by adding the feedback first sum and first carry, the second sum and the second carry and the third carry; and generating the output by adding the fourth sum and the fourth carry.

11. A method as claimed in claim 10, wherein the method further comprises the step of:

selecting and storing the predetermined portions of the first sum and the first carry in the first cycle before performing the step of (c) in order to optimize an operation timing and to compensate a delay time for receiving the multiplier data and the multiplicand data.

12. An apparatus for multiplying floating point data in two pipeline cycles comprising:

(a) a first input means for receiving multiplier data from a multiplier data bus, wherein the first input means stores a predetermined portion of the received multiplier data and selects a remaining portion of the received multiplier data in a first cycle and selects the stored portion of the multiplier data in a second cycle;

(b) a second input means for receiving multiplicand data from a multiplicand data bus, wherein the second input means selects and stores the received multiplicand data in the first cycle and selects the stored multiplicand data in the second cycle;

(c) partial product generating means for generating a partial product by means of the multiplier data and the multiplicand data respectively received from the first input means and the second input means in the first cycle;

(d) adding tree means for generating a first sum and a first carry by adding the partial product generated from the partial product generating means in the first cycle; and (e) output means for generating output by doing feedback each predetermined portion of the first sum and the first carry to the second cycle and adding the feedback portions of the first sum and the first carry, a third carry and a second sum and a second carry respectively generated in the second cycle, wherein the third carry is generated by adding each remaining portion of the first sum and the first carry.

13. The apparatus as claimed in claim 12, wherein the output means comprises:

a third and a fourth storing means for respectively storing upper bits of the first sum and upper bits of the first carry from the adding tree means to feed back the upper bits to the second cycle, wherein the number of the upper bits of the first sum is the number of bits of the first sum minus the number of bits of the multiplicand data, and the number of the upper bits of the first carry is the number of bits of the first carry minus the number of bits of the multiplicand data;

a first adding means for generating a third carry by adding remaining bits of the first sum and remaining bits of the first carry, wherein the third carry is added in the second cycle;

a 4 to 2 adding means for adding a second sum and a second carry respectively generated in the second cycle, the feedback upper bits of the first sum and first carry and the third carry to generate a fourth sum and fourth carry;

a third and a fourth selection means for respectively selecting the upper bits of the first sum and the first carry in the first cycle, and respectively selecting the fourth sum and the fourth carry in the second cycle; and a second adding means for generating the output by adding the fourth sum and the fourth carry.

* * * * *